3,351,528
COMPOSITIONS AND METHOD FOR STIM-
ULATING THE CENTRAL NERVOUS
SYSTEM
Anthony W. Pircio, East Brunswick, and Christie Semmes
Krementz, Morristown, N.J., assignors to Bristol-Myers
Company, New York, N.Y., a corporation of Delaware
Filed Dec. 30, 1964, Ser. No. 422,286
16 Claims. (Cl. 167—65)

This invention relates to compositions of matter that are useful as central nervous system stimulants and to methods of administering these compositions to animals. More particularly, it relates to compositions of the above character which have central nervous system stimulating activity of the order of caffeine and to methods of their administration.

Caffeine has long been known for its action as a central nervous system stimulant. However, for this purpose it has certain drawbacks. Thus, for example, although the maximum stimulatory effect of caffeine is reached with relatively low doses, larger dosages cause a reversal of action, resulting in depression rather than stimulation. In addition, the duration of action of caffeine and its degree of toxicity leaves something to be desired.

It has now been found that caffeine-like central nervous system stimulation can be obtained in animals by administration to said animals 3-(p-aminophenylsulfonyl)-3-azabicyclo[3.2.2]nonane or non-toxic salts thereof. These have been found to be less toxic than caffeine and to be effective for longer periods of time. Furthermore, these compounds produce a dose response curve, and the reversal of action so characteristic of caffeine is substantially absent.

It is accordingly an object of the present invention to provide a composition of matter having caffeine-like central nervous system stimulating activity without the disadvantages that attend the use of caffeine.

It is also an object of the present invention to provide a method for inducing central nervous system stimulation in animals, which involves the administration of a composition of matter comprising 3-(p-aminophenylsulfonyl)-3-azabicyclo(3.2.2)nonane or its non-toxic salts.

Other and more detailed objects of this invention will be apparent from the following description, claims and drawings wherein:

Figure 1:
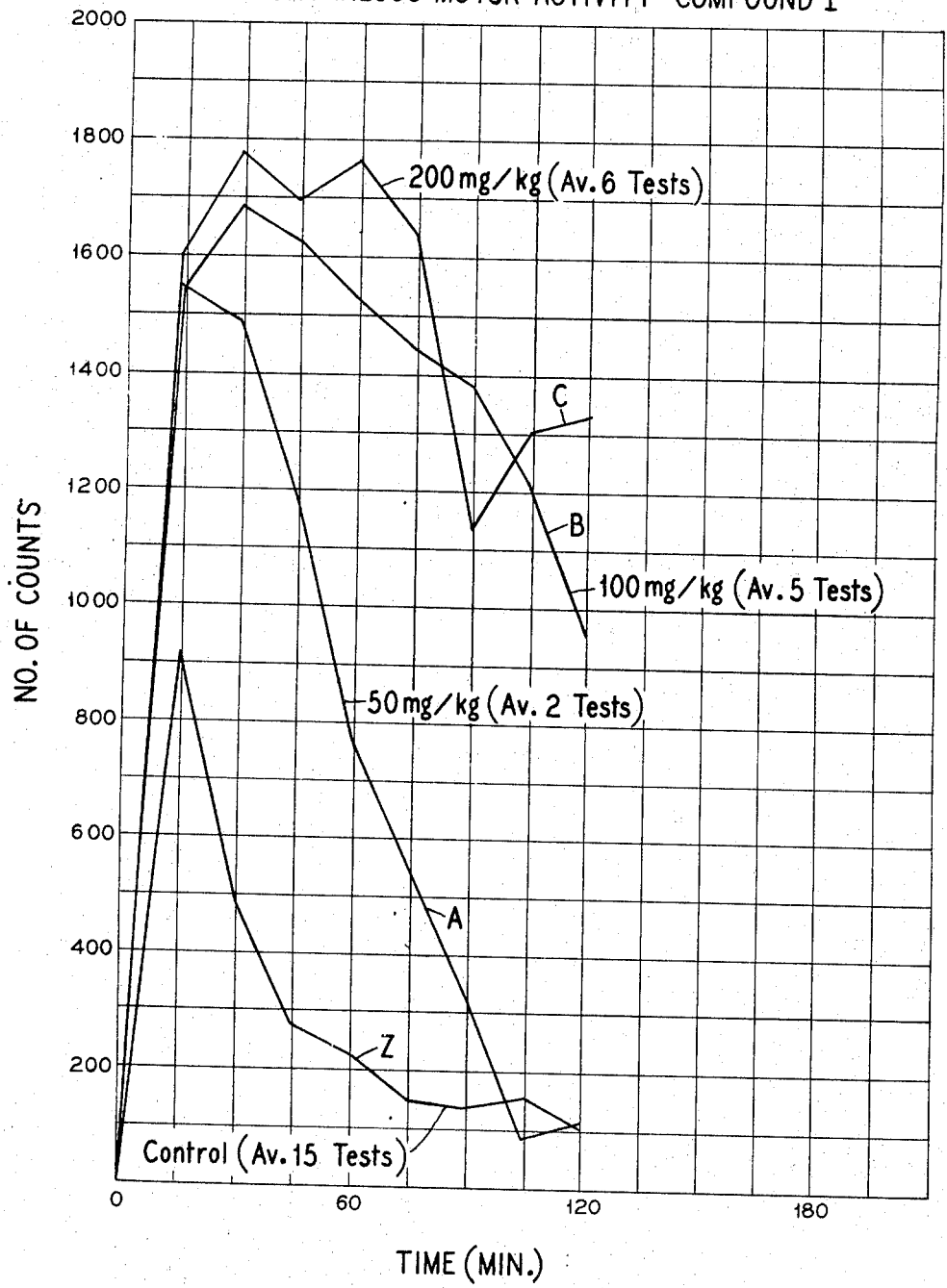
FIGURE 1 is a graph illustrating the central nervous system stimulation induced in mice by various doses of compounds embodied in the present invention.

The 3 - (p - aminophenylsulfonyl)-3-azabicyclo[3.2.2] nonane that is useful in accordance with the present invention may be described by the formula:

I.

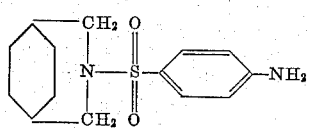

hereinafter referred to as Compound I. In addition to Compound I the non-toxic acid addition salts may be employed. By way of example, the hydrochloride, hydrobromide, sulfate and phosphate may be mentioned.

Compound I may be prepared by reacting 3-azabicyclo [3.2.2]nonane with p-nitrobenzenesulfonyl chloride, preferably in the presence of an HCl binding agent. The 3-(p-nitrobenzenesulfonyl) - 3 - azabicyclo[3.2.2]nonane produced by this reaction may then be hydrogenated under the usual reducing conditions to convert the nitro groups to an amino group.

In an alternative procedure for preparing Compound I, 3-azabicyclo[3.2.2]nonane may be reacted with p-acetylaminophenylsulfonyl chloride, also preferably in the presence of an HCl binding agent. The acetyl group of the 3 - (p - acetylaminophenylsulfonyl)-3-azabicyclo [3.2.2]nonane prepared by this reaction may be hydrolyzed off in the usual manner, e.g., by acid hydrolysis.

The salts are prepared by reacting the free base, i.e., Compound I with an appropriate acid. Typical acids include hydrochloric acid, hydrobromic acid, sulfuric acid and phosphoric acid.

The dosages in which the active ingredients utilized in the present invention are given may vary somewhat. In general, it will be in the range of 0.25 to 20 grains. The preferred range is, however, from 0.5 to 10 grains, the optimum results being obtained with a dose in the range of from 1 to 5 grains.

Compound I or its non-toxic salts may be administered in any suitable form. Usually it will be incorporated in a non-toxic liquid or solid pharmaceutical carrier or excipient. Thus, for example, simple aqueous solutions or dispersions of Compound I or its non-toxic salts have been found suitable for use in accordance with this invention. However, the active material may be incorporated in pharmaceutical carrier forms, such as tablets or capsules which may contain other materials as fillers or diluents, such as lactose, sucrose, mannitol; or may contain such binding agents as glucose, gum acacia, gelatin, starch paste; or lubricants, such as magnesium stearate and talc; as well as such disintegrating agents as corn starch, microcrystalline cellulose, etc.

The compositions of the present invention may contain Compound I or its non-toxic salts as the sole pharmacologically active ingredient or may also contain other active ingredients. Thus, it may be combined with other central nervous system stimulants in a suitable dosage form. Furthermore, it may be combined with nutritional factors, e.g., vitamins, hematinics in compositions designed to increase the general well being of the animal subjects. Moreover, it may be used to potentiate the effect of analgesics, e.g., aspirin, acetaminophen, salicylamide and phenacetin.

When incorporated in a carrier the active ingredient, i.e., Compound I or its non-toxic salts, is present in sufficient quantity to provide the dosages set forth above. In this form said active ingredient will generally constitute from 1 to 90% by weight of the total composition and preferably from 1 to 5% by weight of said total composition.

To demonstrate the activity of the compositions of the present invention and to compare them with the activity of comparable caffeine-containing compositions, the effect of the various materials on the spontaneous motor activity of mice was measured. In each test, immediately after oral dosing with the test drug suspended in water, or with an equivalent volume of water in the case of the control, the test animals (5 mice per test) were placed in a circular chamber designed to measure the motor activity of the animals by recording the number of times photoelectric beams were broken. The number of times the beams were broken is referred to as the activity count. Cumulative activity counts were taken every fifteen minutes for a period of two hours. The activity count covering each 15-minute period was calculated by subtracting the cumulative count at the beginning of the 15-minute period from the cumulative count at the end of the 15-minute period. Plots of the activity against time induced by Compound I and caffeine are presented in FIGURES 1 and 2, respectively.

FIGURE 1 summarizes the results of the tests using Compound I of this invention as the test material in various dosages. Curve A summarizes the results obtained with a dose of 50 mg./kg. of body weight of the test animal of Compound I, whereas curves B and C summarize the results with 100 mg./kg. and 200 mg./kg. doses. The data recorded are averages of the number of tests indicated for each curve, each test involving the use of 5 animals. Curve Z summarizes the results of the controls.

The apparent activity in the initial stages of the controls, which quickly falls away, is explained by the initial curiosity of the animals when placed in the new and strange environments of the test apparatus. In any event, the response of the test animals which were given Compound I is well above that of the controls.

Figure 2:
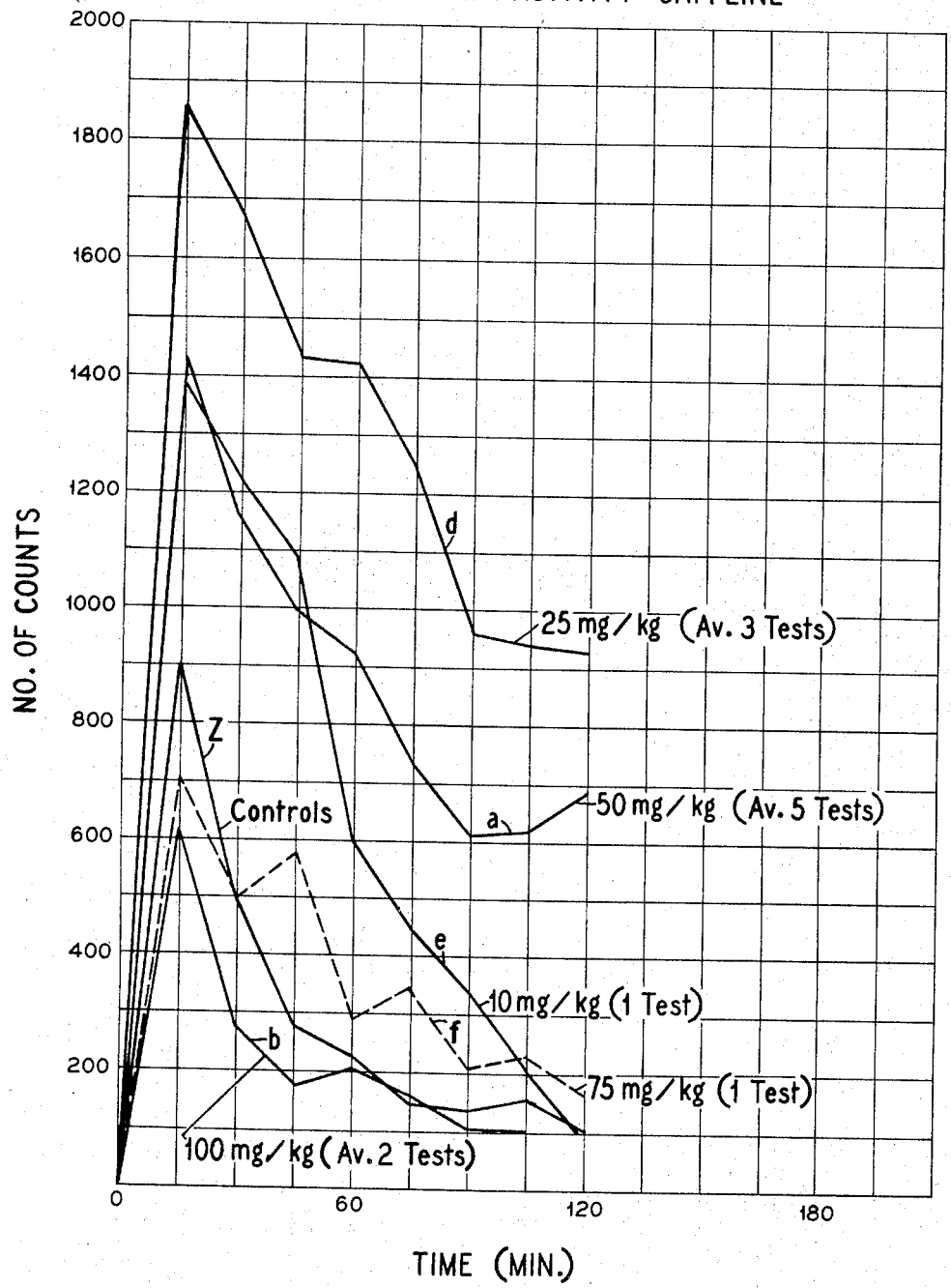
FIGURE 2 is a graph similar to that shown in FIGURE 1 but showing the corresponding action induced with caffeine.

FIGURE 2 summarizes the results of the test using caffeine as the active material, the dosages corresponding to each of the curves being indicated in the graph. Again the control curve is designated as Z. Curve $f$, the 75 mg./kg. curve, is shown in broken line so as not to be confusing with the adjacent curves.

An examination of FIGURE 2 will show that the activity of caffeine rises to a maximum with a dose of 25 mg./kg. and that then there is a reversal, the activity at 50 mg./kg. and at 75 mg./kg. being less than that of the 25 mg./kg. dose. At a dose of 100 mg./kg. the activity of caffeine is below the control indicating a depression rather than a stimulation of the test animals.

In contrast to this, FIGURE 1 shows that Compound I used in this invention has dose response curve characteristics. The activity of the drug increases progressively with the increase in the dose administered.

A comparison of FIGURES 1 and 2 will also show that the compounds utilized in this invention are longer acting than caffeine. This can be demonstrated by comparing curve C of FIGURE 1 with curve $d$ of FIGURE 2, each representing the maximum response for the respective drugs. It will be seen that after 120 minutes only moderate activity is shown with caffeine in a 25 mg./kg. dose taking as an indication of activity any increase above the maximum activity shown by the controls. In contrast curve C of FIGURE 1 shows very substantial activity after 120 minutes using the same frame of reference indicated above.

As mentioned above, the compounds utilized in this invention are far less toxic than caffeine. This is demonstrated below in an acute toxicity test wherein the Compound I is compared with caffeine.

In the procedure mice were employed to test each compound. The test drug suspended in distilled water was given by gastric intubation to female, albino Swiss-Webster strain mice (20±3 g.). The test animals were observed for acute lethal effects for 6 hours following dosing. Observation was continued for a period of 7 days after administration of the test drug for any delayed toxic manifestations. The animals exhibited increased spontaneous activity at all dose levels studied. With dose levels as high as 4000 mg./kg. of Compound I only occasional deaths have been observed. The acute oral $LD_{50}$ in mice is therefore greater than 4000 mg./kg. Table I presents comparative data on the acute toxicity of caffeine and Compound I.

Table I

| Compound: | Oral $LD_{50}$ in mice (mg./kg.) |
|---|---|
| Caffeine | 500 |
| Compound I | >4000 |

Although the maximum response for caffeine is obtained with a dose of 25 mg./kg., whereas the maximum response with Compound I is obtained with a dose of 200 mg./kg., it will be noted that, in general, the response elicited with 25 mg./kg., of caffeine is more comparable to that obtained with 100 mg./kg. of Compound I over a period of 120 minutes. This can be readily ascertained by noting the similarity of curves C of FIGURE 1 with $d$ of FIGURE 2. It is therefore justified, in arriving at the therapeutic ratio of the respective drugs for the purposes of comparing their usefulness, to consider the response obtained with 25 mg./kg. of caffeine as equatable with that obtained with 100 mg./kg. of Compound I.

The therapeutic ratio can be considered the ratio of the lethal dose of a drug to its effective dose. A high therapeutic ratio is desirable for a drug, since it indicates that the spread between the lethal dose and effective dose is high and the drug may be administered with minimal danger.

The therapeutic ratio of Compound I may thus be determined as 4000/100 or 40, whereas that for caffeine may be determined as 500/25 or 20 using the toxicity figures given in Table I above. This indicates that Compound I has a therapeutic ratio which is at least 2 times that of caffeine.

One manner by which central nervous system stimulants are known to act are through the release of catecholamines from their stores. Reserpine is known to dissipate or otherwise make the catecholamines unavailable for action. Thus, when a central nervous system stimulant which acts indirectly by the release of catecholamines is given to a reserpinized animal, there will be substantially no response. If, on the other hand, the central nervous system stimulant acts directly and not through the release of the catecholamines, its activity will be substantially unimpaired by the fact that the animal has been previously treated with reserpine.

Figure 3:
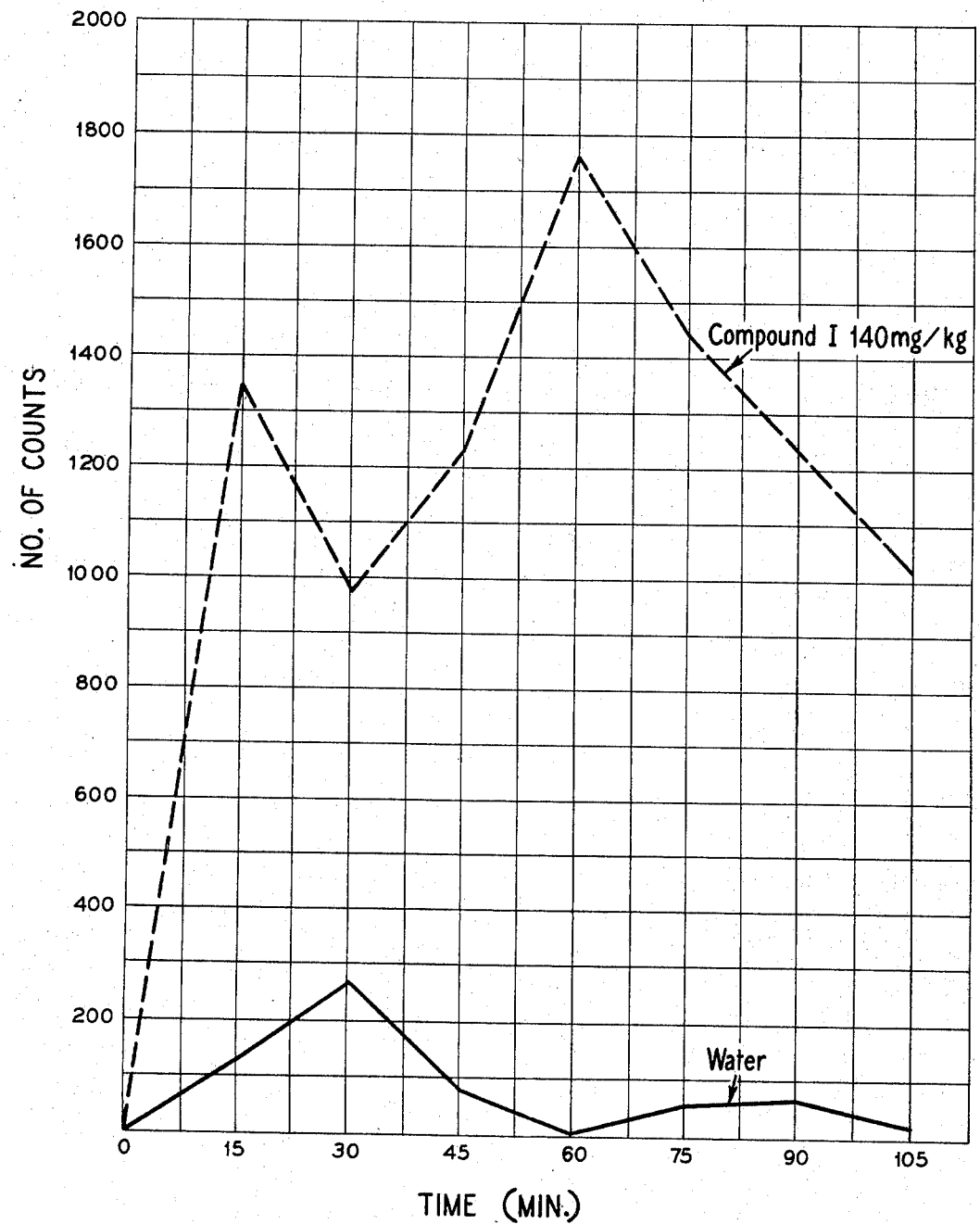
FIGURE 3 is a graph similar to that shown in FIGURES 1 and 2 showing the results obtained by the administration to mice who have previously been treated with reserpine, a compound falling within the present invention.

FIGURE 3 summarizes the results obtained by treating reserpinized mice with Compound I of this invention. The good stimulant activity demonstrated by the curve indicates that Compound I acts directly and not through the release of catecholamines.

The following examples are further illustrative of the present invention. It is to be understood, however, that the invention is not limited thereto.

EXAMPLE 1

Preparation of 3-azabicyclo[3.2.2]nonane

The apparatus used for the reaction consisted of a 36-inch, 1.0-inch-O.D., thin-wall, vertical, stainless steel tube. A pyrolysis tube constructed of 25-mm.-O.D. Vycor tubing 15 inches long was used for small runs. The tube was packed with 2¼ inches of 5-mm. solid glass beads on the bottom, 200 ml. of Alcoa Grade F–1, 7–14 mesh activated alumina in the middle, and 5 inches of 5-mm. solid glass beads on top. A steam-jacketed condenser attached to the top of the pyrolysis tube served as a preheater. The nitrogen supply was connected at a point between the pyrolysis tube and the preheater. The 1,4-cyclohexanebis(methylamine) feed line was connected to the top of the preheater. The pyrolysis section was heated by external electric heaters. A thermocouple was inserted into a ¼-inch-O.D. stainless steel thermowell located at the midpoint of the catalyst bed, and the lead wires were connected to a Wheelco Model 224–TC–B temperature indicator-controller.

For a typical run, the pyrolysis temperature was maintained at 385–395° C.; the feed rate was 8.4 grams per minute of 1,4-cyclohexanebis(methylamine) and 1.47 grams per minute of nitrogen (this is a ratio of 0.885 mole of nitrogen per mole of 1,4-cyclohexanebis(methylamine) per hour). The crude reaction product was collected in a chilled flask and the nitrogen and reaction gases were vented to a hood. These conditions were maintained for 15.5 hours, during which time 7,849 grams (55 moles) of 1,4-cyclohexanebis(methylamine) was fed to the unit. The total crude product obtained weighed 7,269 grams. The cis-trans ration of 1,4-cyclohexanebis (methylamine) does not affect the yield or conversion. For most work, 60 to 70% trans 1,4-cyclohexanebis (methylamine) was used.

Distillation of the crude product at atmospheric pressure to a base temperature of 260–270° C. yielded 4,655 grams of a fraction rich in 3-azabicyclo[3.2.2]nonane which crystallized on standing (Note 1). The crystals were collected and recrystallized from an equal weight of acetone to yield 1,480 grams of 3-azabicyclo[3.2.2]nonane. Gas chromatography of the filtrates of this first fraction through a 6-foot column packed with 15% Carbowax 20M on white Chromosorb indicated 1,854 grams of 1,4-cyclohexanebis(methylamine) and 721 grams of 3-azabicyclo [3.2.2]nonane present.

The remainder of the crude product was distilled at 1–5 mm. to a base temperature of 200–225° C. The yield was 1,957 grams of unchanged 1,4-cyclohexanebis(methylamine). Thus, a total of 2,201 grams (17.6 moles, 62.1% yield) of 3-azabicyclo[3.2.2]nonane was produced. A total of 3,811 grams (26.8 moles, 54.1% convn.) of 1,4-cyclohexanebis(methylamine) was recovered.

$$\text{Conv., percent} = \frac{\text{g.-moles of 1, 4-cyclohexanebis (methylamine) consumed}}{\text{g.-moles of 1, 4-cyclohexanebis (methylamine) fed}}$$

$$\text{Yield, percent} = \frac{\text{g.-moles 3-azabicyclo [3.2.2] nonane obtained}}{\text{g.-moles 1, 4-cyclohexanebis (methylamine) consumed}}$$

Note 1: For this distillation a simple still is used, i.e., 1–3 plates. This first part of the distillation may also be carried out at 180–200 mm. Hg to a base temperature of 200–210° C. or a head temperature of 180–190° C., which ever occurs first.

EXAMPLE 2

*Preparation of 3-(p-aminobenzenesulfonyl)-3 azabicyclo[3.2.2]nonane*

To a three (3) liter, three-neck flask equipped with a stirrer, thremometer, and condenser was charge 30 g. (0.24 mole) of 3-azabicyclo[3.2.2]nonane, 44.3 g. (0.2 mole) of p-nitrobenzenesulfonyl chloride and two (2) liters of water. The pH of the reaction mixture was adjusted to 14 with a 10% solution of sodium hydroxide; the reaction mixture was then slowly heated to 75° C. and heating stopped. The reaction mixture was cooled to 20° C. and 44 g. (71% of theory) of crude 3-(p-nitrobenzenesulfonyl)-3-azabicyclo[3.2.2]nonane was collected by filtration.

The crude 3-(p-nitrobenzenesulfonyl)-3-azabicyclo[3.2.2]nonane (44 g., 0.14 mole), 5 g. alcohol wet Raney nickel, and 400 ml. methyl alcohol were charged to an autoclave and reduced at 70° C. at 1000 p.s.i. hydrogen pressure until absorption of hydrogen had stopped. The crude reduced product was filtered hot to remove the Raney nickel catalyst. The filtrate was cooled to 20° C. and the solid 3-(p-aminobenzenesulfonyl)-3-azabicyclo [3.2.2]nonane was collected by filtration (38.9 g.—98% theory), M.P. 149–151° C.

The hydrochloride addition salt of 3-(p-aminobenzenesulfonyl)-3-azabicyclo[3.2.2]nonane is formed by the conventional technique of neutralizing the amine base with hydrochloric acid. In a similar fashion, the sulfate, hydrobromide and phosphate are prepared using sulfuric acid, hydrobromic acid or phosphoric acids respectively.

EXAMPLE 3

*Formulation for tablets*

Grams per tablet
(1) 3-(p-aminophenylsulfonyl)-3-azabicyclo[3.2.2]
  nonane _____ 0.060
(2) Lactose _____ 0.150
(3) Sucrose _____ 0.010
(4) Corn starch _____ 0.020
(5) Stearic acid _____ 0.005

EXAMPLE 4

*Formulation for tablets*

(1) 3-(p-aminophenylsulfonyl)-3-azabicyclo[3.2.2]
  nonane _____ 0.300
(2) Lactose _____ 0.100
(3) Sucrose _____ 0.010
(4) Corn starch _____ 0.050
(5) Stearic acid _____ 0.010

EXAMPLE 5

*Formulation for tablets*

(1) 3-(p-aminophenylsulfonyl)-3-azabicyclo[3.2.2]
  nonane _____ 0.015
(2) Aspirin _____ 0.200
(3) Acetaminophen _____ 0.100
(4) Corn starch _____ 0.035
(5) Stearic acid _____ 0.005

EXAMPLE 6

*Formulation for tablets*

(1) 3-(p-aminophenylsulfonyl)-3-azabicyclo[3.2.2]
  nonane _____ 0.200
(2) Aspirin _____ 0.200
(3) Acetaminophen _____ 0.100
(4) Corn starch _____ 0.050
(5) Stearic acid _____ 0.010

These materials are granulated according to conventional pharmaceutical methods and compressed into tablets.

EXAMPLE 7

*Formulation of oral elixir*

(1) The hydrochloride salt of 3-(p-aminophenylsulfonyl)-3-azabicyclo[3.2.2]nonane _____grams__ 475
(2) Aromatic elixir, USP, to make _____liters__ 47.5

Use of the above formula will make 100-pint bottles of oral elixir. Each bottle contains approximately 100 one-teaspoon doses. Each dose contains 50 mg. active salt.

Although the invention has been described with reference to specific forms thereof, it will be understood that many changes and modifications may be made without departing from the spirit of this invention.

What is claimed is:

1. A composition of matter comprising a non-toxic pharmaceutical carrier and a compound selected from the group consisting of 3-(p-aminophenylsulfonyl)-3-azabicyclo[3.2.2]nonane and non-toxic acid salts thereof, said composition containing said compound in sufficient quantity to serve as a central nervous system stimulant.

2. A composition according to claim 1 wherein said carrier is an aqueous medium.

3. A composition according to claim 1 wherein said compound comprises from about 1% to 90% by weight of said composition.

4. A composition according to claim 1 wherein said compound is 3-(p-aminophenylsulfonyl)-3-azabicyclo[3.2.2]nonane.

5. A composition of matter useful as a central nervous system stimulant comprising 3-(p-aminophenylsulfonyl)-3-azabicyclo[3.2.2]nonane distributed in an aqueous medium, said composition containing about 1% to 5% by weight of said 3-(p-aminophenylsulfonyl)-3-azabicyclo [3.2.2]nonane.

6. A composition of matter comprising a non-toxic pharmaceutical carrier and as an essential active ingredient, from 0.25 to 20 grains of a compound selected from the group consisting of 3-(p-aminophenylsulfonyl)-3-azabicyclo[3.2.2]nonane and non-toxic acid salts thereof.

7. A composition according to claim 6 containing from 0.5 to 10 grains of said active ingredient.

8. A composition according to claim 6 containing from 1 to 5 grains of said active ingredient.

9. A method of inducing central nervous system stimulation in animals which comprises orally administering to said animals an effective amount of a composition comprising a compound selected from the group consisting of 3-(p-aminophenylsulfonyl)-3-azabicyclo[3.2.2]nonane and non-toxic acid salts thereof.

10. A method according to claim 9 wherein said composition includes a non-toxic pharmaceutical carrier.

11. A method according to claim 9 wherein said compound constitutes about from 1% to 90% by weight of said composition.

12. A method of inducing central nervous system stimulation in animals which comprises orally administering to said animals a composition comprising 3-(p-aminophenylsulfonyl)-3-azabicyclo[3.2.2]nonane distributed in an aqueous medium, said composition containing about 1% to 5% by weight of said 3-(p-aminophenylsulfonyl)-3-azabicyclo[3.2.2]nonane.

13. A method of inducing central nervous system stimulation in animals which comprises orally administering to said animals a therapeutic dose containing as an essential active ingredient, from 0.25 to 20 grains of a compound selected from the group consisting of 3-(p-aminophenylsulfonyl)-3-azabicyclo[3.2.2]nonane and non-toxic acid salts thereof.

14. A method according to claim 13 wherein said compound is distributed in an aqueous medium.

15. A method according to claim 13 wherein said dose contains from 0.5 to 10 grains of said active ingredient.

16. A method according to claim 13 wherein said dose contains from 1 to 5 grains of said active ingredient.

References Cited

UNITED STATES PATENTS 3,239,506   3/1966   Stanin _____ 260—239

ALBERT T. MEYERS, *Primary Examiner.*

JULIAN S. LEVITT, *Examiner.*

S. J. FRIEDMAN, *Assistant Examiner.*